Dec. 8, 1936.  O. CONRADTY  2,063,150
TROLLEY SYSTEM
Filed Dec. 15, 1933
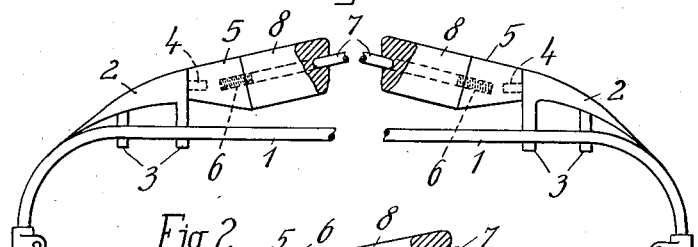
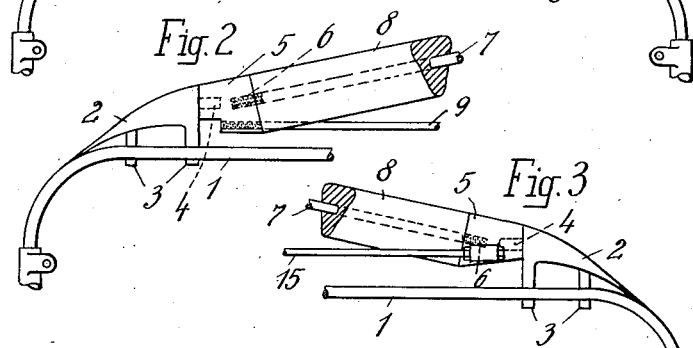
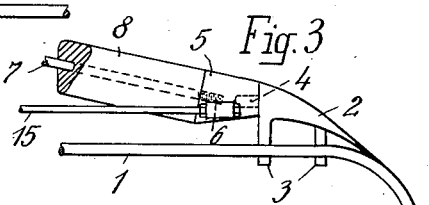
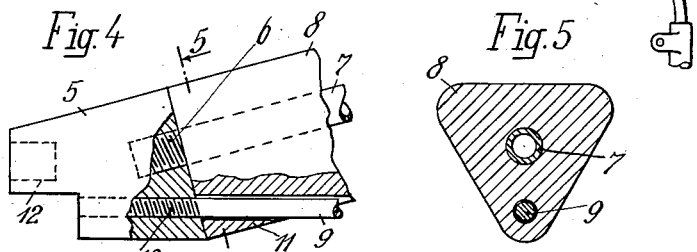
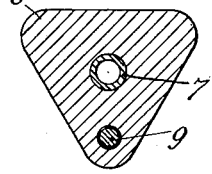
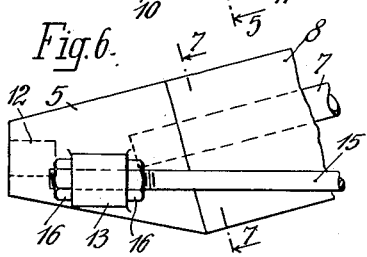
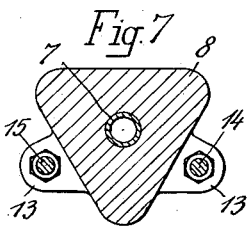
Inventor:
Ottmar Conradty
By Pennie Davis Marvin & Edmonds
Attorneys

UNITED STATES PATENT OFFICE 2,063,150

TROLLEY SYSTEM

Ottmar Conradty, Nuremberg, Germany, assignor to C. Conradty, Nuremberg, Germany, a firm Application December 15, 1933, Serial No. 702,522
In Germany February 17, 1933

7 Claims. (Cl. 191—55)

My invention relates to improvements in trolley systems, and more particularly in trolley systems in which on a trolley pole or bail a curved current collecting member is mounted which comprises a curved metal rod and a carbon body or bodies enclosing the said rod all around, the said collecting member having sufficient strength to withstand the bending and other stresses exerted thereon in railway service.

In trolley systems comprising a straight collecting member embedded in a carbon body or bodies, such as are shown for example in German Patent 369,012, the metal rod has metal bodies screwed to its ends, which metal bodies are rotatably mounted on or in metal bodies rockingly mounted on supporting members provided on the trolley pole or bail, and the said supporting members are connected with each other by a heavy rod secured to lugs or noses provided thereon and having the function to increase the strength of the system.

The object of the improvements is to provide a trolley system of the curved collector type in which the carbon body or bodies are placed all around the curved metal rod. In such systems rotary movement of the collecting member composed of the said rod and carbon body or bodies is not necessary, and therefore in my improved system the said collecting member is rigidly secured to end pieces mounted on the trolley pole or bail. The said end pieces may be fixed to the collecting member in any known or preferred way, for example by being keyed or shrunk to the ends of the rod. But I prefer to provide a screw-connection for the said end pieces. The said end pieces must be stayed relatively to each other, and initially I have provided the system with a heavy connecting rod located below the collecting member. However, I have found that by fixing the said connecting rod to noses and putting the same under tension objectionable bending stresses are imparted to the end pieces, which reduce the strength of the structure and more particularly of the curved collecting member. Further, by putting the said connecting rod under tension the carbon body or bodies and the end pieces are subject to pressure which tends to bend the connecting rod.

I have found that the said heavy connecting rod may be dispensed with if in lieu thereof one or two thin rods are provided which are subject only to tensile stress, and for this reason I mount the said connecting rod or rods so that they are connected with the collecting member within the cross-sectional areas of the end pieces. The axes of the tension rod or rods are preferably mounted in alignment with the axis of the pivot bolts by means of which the collecting member is mounted on the pole or bail, or slightly below the same.

By thus providing a connecting rod or rods which are subjected only to tension the curved collecting member has high strength, because its ends do not change their relative positions, and therefore the curved rod is not bent and the carbon body or bodies are not subject to pressure.

For the purpose of explaining the invention several examples embodying the same have been shown in the accompanying drawing, in which the same letters of reference have been used in all the views to indicate corresponding parts. In said drawing Fig. 1 is a fragmentary diagrammatic elevation showing the top part of the trolley pole or bail and the collecting member mounted thereon, Fig. 2 is a similar elevation showing a modification in which a single tension rod is provided for connecting the end pieces secured to the collecting member, Fig. 3 is a similar elevation showing another modification in which two connecting rods are secured to the end pieces, Fig. 4 is an elevation partly in section and on an enlarged scale showing one of the end pieces and a part of the collecting member of the construction shown in Fig. 2, Fig. 5 is a sectional elevation taken on the line 5—5 of Fig. 4, Fig. 6 is an elevation showing one of the end pieces and a portion of the collecting member secured thereto of the system shown in Fig. 3, and Fig. 7 is a sectional elevation taken on the line 7—7 of Fig. 6.

In the example shown in Fig. 1 the system comprises a trolley pole in the form of a bail 1 having shoes 2 secured thereto by means of screws 3, the said shoes being curved at their top faces to merge into the curved parts of the bail 1. The shoes 2 are provided each with a pivot bolt 4 on which end pieces 5 are rockingly mounted. At their inner ends the said end pieces are formed with internally screw-threaded sockets 6 into which the ends of a curved metal rod or pipe 7 are screwed. On the said metal rod or pipe 7 a carbon body or bodies 8 are mounted, the said metal rod or pipe passing through a bore of the carbon body or bodies so as to be entirely enclosed therein. The carbon body or bodies are triangular in cross-section.

In the modification shown in Figs. 2, 4 and 5 the system comprises the trolley pole or bail 1, the shoes 2 and the end pieces 5 rockingly mounted on the shoes by means of the pivot bolts 4. The end pieces are formed with internally screw-threaded sockets 6 in which the ends of the metal rod or pipe 7 are screwed. On the metal rod or pipe 7 the carbon body or bodies 8 are mounted which are triangular in cross-section, as is shown in Fig. 5. So far the construction is similar to the construction shown in Fig. 1.

The end pieces 5 are connected with each other by a comparatively thin tension rod 9 which screws with its ends in internally screw-threaded bores 10 of the end pieces, and which is passed through bores 11 made in the bottom part of the carbon body or bodies. It appears therefore that the tension rod 9 intersects the end faces of the end pieces 5, and that therefore its axis is located slightly below the axis of the socket 12 by means of which the end pieces are supported on the pivot bolts 4.

The construction shown in Figs. 3, 6 and 7 is similar to the one illustrated in Figs. 2, 4 and 5, and the same letters of reference have been used to indicate corresponding parts. However, the end pieces 5 are made integral at opposite sides with ears 13 formed with bores 14, and through the said bores the ends of tension rods 15 are passed which are fixed in position by means of screw-nuts 16.

Also in the construction shown in Figs. 3, 6 and 7 the ends of the tension rods 15 are located at a level intermediate the top and bottom parts of the end faces of the end pieces 5 and slightly below the axis of the sockets 12, but they are located at opposite sides of the said end pieces. It will be understood that thereby a collecting member of high strength is produced.

I claim:

1. A trolley system, comprising an elongated curved collecting member composed of a carbon body or bodies and a curved metal rod substantially centrally embedded in said body or bodies, sloping metallic end pieces secured to the ends of said rod, said pieces serving as bridge-bearings, and a trolley pole and staying means for said collecting member, the engaging faces of the end pieces and of the body or bodies being in planes substantially perpendicular to the axis of the rod where it is secured to the end pieces.

2. A trolley system, comprising an elongated curved collecting member composed of a carbon body or bodies and a curved metal rod substantially centrally embedded in said body or bodies, sloping metallic end pieces screwed to the ends of said rod and serving as bridge-bearings, and a trolley pole and staying means for said collecting member, the engaging faces of the end pieces and of the body or bodies being in planes substantially perpendicular to the axis of the rod where it is secured to the end pieces.

3. A trolley system, comprising an elongated curved collecting member composed of a carbon body or bodies and a curved metal rod substantially centrally embedded in said body or bodies, sloping, rotatable metallic end pieces secured to the ends of said rod and serving as bridge-bearings, a rod secured to and connecting said end pieces, and a trolley pole or bail on which said collecting member is mounted, the engaging faces of the end pieces and of the body or bodies being in planes substantially perpendicular to the axis of the rod where it is secured to the end pieces.

4. A trolley system, comprising an elongated curved collecting member composed of a carbon body or bodies and a curved metal rod substantially centrally embedded in said body or bodies, sloping, rotatable metallic end pieces screwed to the ends of said rod and serving as bridge-bearings, a rod secured to and connecting said end pieces, and a trolley pole or bail on which said collecting member is mounted, the engaging faces of the end pieces and of the body or bodies being in planes substantially perpendicular to the axis of the rod where it is secured to the end pieces.

5. A trolley system, comprising an elongated curved collecting member composed of a carbon body or bodies and a curved metal rod substantially centrally embedded in said body or bodies, sloping, rotatable metallic end pieces secured to the ends of said rod and serving as bridge bearings, rods connecting said end pieces and located one at either side thereof, and a trolley pole or bail on which said collecting member is mounted, the engaging faces of the end pieces and of the body or bodies being in planes substantially perpendicular to the axis of the rod where it is secured to the end pieces.

6. A trolley system, comprising an elongated curved collecting member composed of a carbon body or bodies and a curved metal rod substantially centrally embedded in said body or bodies, sloping, rotatable metallic end pieces secured to the ends of said rod and serving as bridge-bearings, a rod connecting said end pieces and located with its ends at a level between the top and bottom parts thereof, and a trolley pole or bail on which said collecting member is mounted, the engaging faces of the end pieces and of the body or bodies being in planes substantially perpendicular to the axis of the rod where it is secured to the end pieces.

7. A trolley system, comprising an elongated curved collecting member composed of a carbon body or bodies and a curved metal rod substantially centrally embedded in said body or bodies, sloping, rotatable metallic end pieces secured to the ends of said rod and serving as bridge-bearings, rods connecting said end pieces and located one at either side thereof and at a level intermediate the top and bottom parts thereof, and a trolley pole or bail on which said collecting member is mounted, the engaging faces of the end pieces and of the body or bodies being in planes substantially perpendicular to the axis of the rod where it is secured to the end pieces.

OTTMAR CONRADTY.